2 Sheets—Sheet 1.

J. O. BROWN,

Assignor to THE BROWN QUADRICYCLE COMPANY.

VELOCIPEDE.

No. 10,307. Reissued Apr. 10, 1883.

Attest,
L. J. Matts.

Inventor
James O. Brown
By his atty.

M. PETERS, Photo-Lithographer, Washington, D. C.

J. O. BROWN,

Assignor to THE BROWN QUADRICYCLE COMPANY.

VELOCIPEDE.

No. 10,307. Reissued Apr. 10, 1883.

Attest:
L. J. Mitor.
Davis

Inventor
James O. Brown
By his atty.
[signature]

N. PETERS, Photo-Lithographer, Washington, D. C.

UNITED STATES PATENT OFFICE.

JAMES O. BROWN, OF BANGOR, MAINE, ASSIGNOR TO THE BROWN QUADRICYCLE COMPANY, OF PHILADELPHIA, PENNSYLVANIA.

VELOCIPEDE.

SPECIFICATION forming part of Reissued Letters Patent No. 10,307, dated April 10, 1883.

Original No. 256,118, dated April 11, 1882. Application for reissue filed October 3, 1882.

*To all whom it may concern:*

Be it known that I, JAMES O. BROWN, of the city of Bangor, in the county of Penobscot and State of Maine, have invented an Improvement in Velocipedes, of which the following is a specification.

My invention has reference to velocipedes generally, but more particularly to that class which have more than two wheels; and it consists of two large forward wheels upon independent axles, to one only of which propelling-power is applied, and two small trailing wheels adapted to run upon the ground between the two large wheels, and tolerably close to their line of contact with the ground or tread; further, in hinging said trailing wheels to the frame at a point in advance of their axis and combining them with means to govern and control their movements, to the end that they may steer the velocipede; further, in combining the steering device with brake devices adapted to act upon each of the two forward wheels independently; further, in arranging the seat close to the main axle, between the wheels and somewhat to the rear of their axes; further, in so constructing the axle-frame that the two independent axles may be so set that the large wheel will have an angle the focus of which might be anywhere from below to in front of the machine; further, securing to one of the main shafts a sprocket-wheel, and arranging below and somewhat in advance a second sprocket-wheel upon the crank-axle and supported in adjustable bearings, and an endless chain working over both of said wheels or other equivalent device; and in minor details of construction, all of which are more fully set forth in the following specification and shown in the accompanying drawings, which form part thereof.

The object of this invention is to construct a velocipede which can be ridden by both the male and female sex with equal facility; that shall be steered, as a horse would be governed, by the reins; that shall be adapted to turn in a very limited space; that shall be so constructed that it may be stopped instantly; that the wheels may be set at any desired angle, and that cannot upset the rider.

Figure 1:
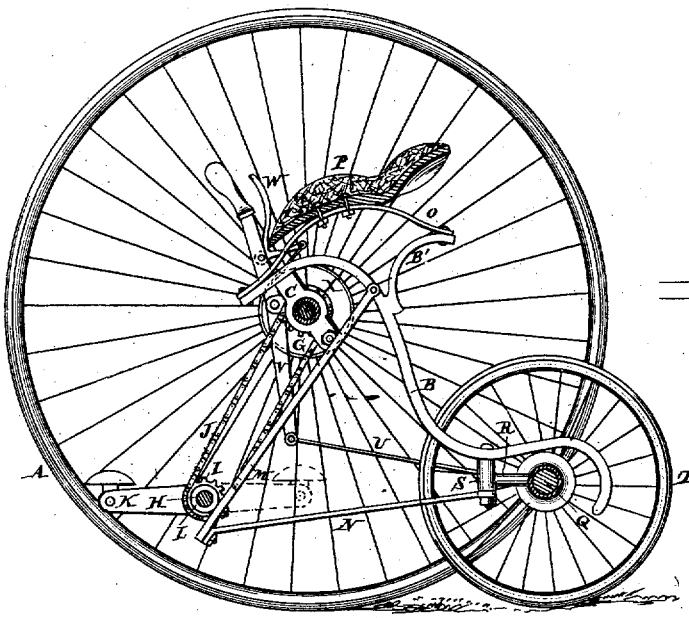
Figure 2:
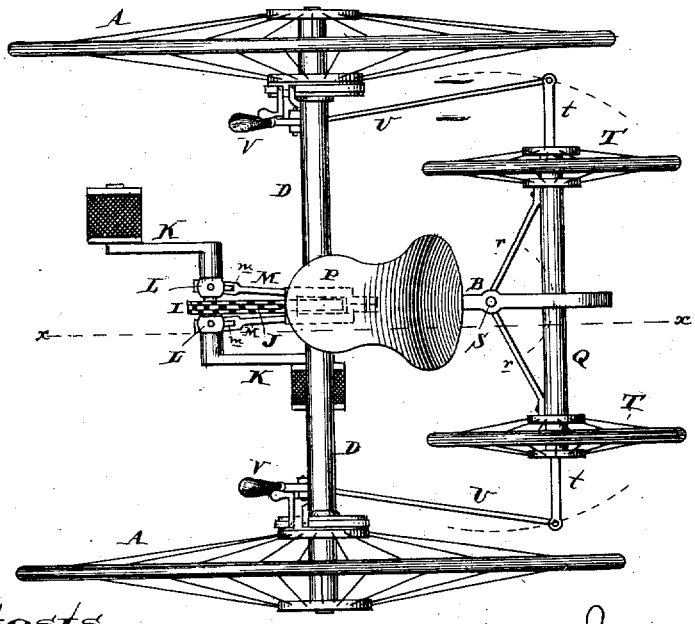
Figure 3:
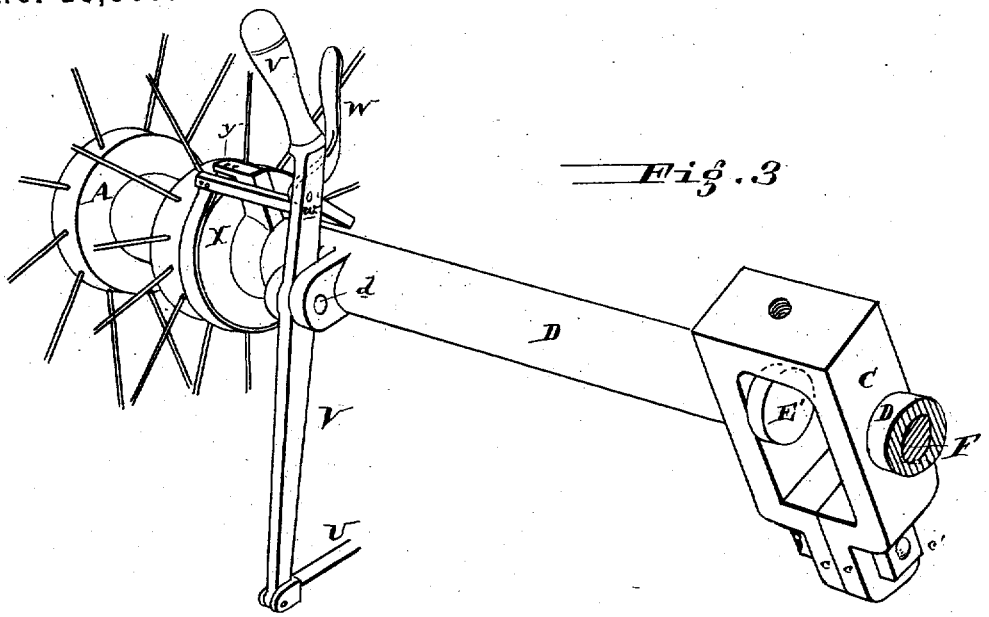
Figure 4:
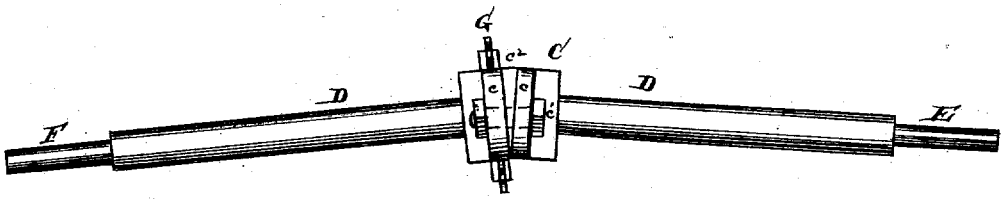
Figure 5:
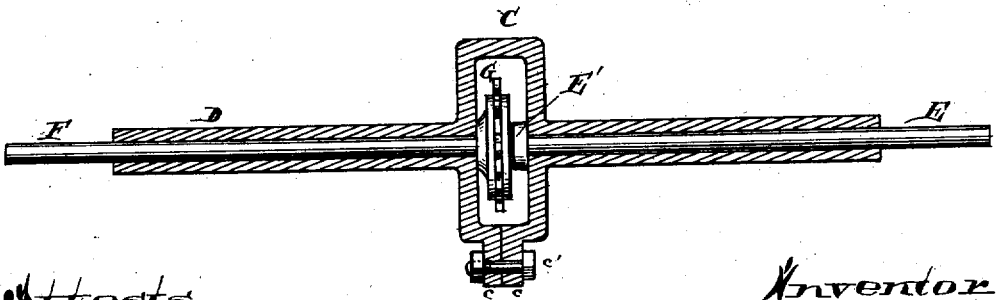

In the drawings, Figure 1 is a sectional side elevation on line *x x* of a velocipede embodying my improvement. Fig. 2 is a plan of same. Fig. 3 is a perspective view, showing the axle-frame, one of the main axles, the steering device, and brake devices. Fig. 4 is a view from below of the axle-frame and axles, and shows the two independent axles and sprocket-wheel in elevation, and one method of giving an angular run to the wheels; and Fig. 5 is a sectional elevation of the axle-frame, and shows the two independent axles and the sprocket-wheel in elevation.

A A are the main wheels, one of which is secured to the idler-shaft E, having its bearing in the axle-frame D, and provided with a collar or head, E′, to keep it in place. The other of said wheels is secured upon the driving-shaft F, having its bearings also in the axle-frame D, and carrying on its inner end a chain or sprocket wheel, G, which rests against the collar E′ of shaft E, and works within an □-shaped frame, C, which joins the two parts of the frame D, said frame C being split at the bottom, forming lugs *c c*, which are bolted together by bolt *c′*.

Secured to the frame C and extending back is the frame B, which is provided with an arm, B′, upon which and the end of the frame B the spring O, which supports the seat P, rests.

The axle Q carries the idler trailing wheels T, which are the steering-wheels, and is provided with an extension, R, secured from lateral strain by braces *r*, which is pivoted to frame B at S, some few inches in advance of the axle of the trailing-wheels, to keep said wheels in line when the steering device is not actively used.

The braces M and N support the axle H, which carries the sprocket or chain wheel I and cranks K, said axle being carried in bearings L, made adjustable in braces M by means of slots *m*.

Passing over wheels I and G is an endless sprocket-chain, J.

Pivoted at *d* to the axle-frame D, and close to either wheel A, are the steering-levers V V, provided at the top with handles, and at the bottom pivoted to rods U, which in turn are fastened or pivoted to extensions *t* of the axle Q.

The brake-lever or bell-crank W is either pivoted to the lever V at *w*, as shown, or directly to the frame D, and to one end of said levers W is secured a brake-strap, Y, which encircles the wheel face or hub X on the wheel A, said strap being secured at the other end to lug *y* on the frame D. One of these brakes is preferably arranged to act upon each wheel.

In operating the machine, the operator sits upon the seat P and places his feet upon the cranks K, and upon rotating the wheels I the chain J transmits a like motion to wheel G and shaft F, rotating the driving-wheel A and propelling the machine. To steer either to one side or the other, the operator pulls upon the respective steering-levers V, which action swings the trailing axle and wheels T into the proper position to steer the velocipede as desired. By having two steering-levers V it is not necessary to push upon either to steer the machine, and the operator can at all times support or balance himself, as in rapid driving he pulls back on both steering-levers, thereby giving himself better purchase upon the driving treadles or cranks; and by having two such steering-levers arranged on either side of the seat, and with the latter almost over the straight axle and trailing wheels close to said seat, the operator can with facility raise said trailing wheels, allowing of easy descent to the ground, or vice versa; and if, when going at full speed, he desires to stop, by pulling upon both levers he can rapidly stop the cranks, as he then brings the muscles of the arms into play as well as the legs, and without interfering with the steering of the machine. The two steering-levers V also are useful in wheeling the machine around when they are used as handles, after tipping the machine up so as to raise the trailing wheels. The rear trailing wheels T being close to the treading-point of the large wheels A, the velocipede is far more easily run over obstructions in the roadway and more quickly turned. To turn on the driving-wheel A as if on a pivot, suddenly press hard upon the brake-lever W, which governs the rotation of shaft F, at the same time holding the cranks rigid with the feet and leaning the body forward so as to balance the machine, when the velocipede will rotate upon the wheels A, the driver acting as the pivot or axis of rotation.

By joining the bearings of the frame D by the split frame C the axles and wheels may be set at an angle, as shown in Fig. 4, by inserting a small wedge-shaped piece, $C^2$; or the same effect may be obtained by beveling off the edges of said lugs *c c*, and thereby give any angle to the wheels A, whose focus or point of intersection will be preferably from below to before the machine, but which may be any distant point in a plane passed through the middle points of the axle Q and frame D C.

I am aware of English Patent No. 1,306 of 1877; but it is for an entirely different arrangement of propelling and steering devices, and I claim nothing therein shown or described.

Having now described my invention, what I claim as new, and desire to secure by Letters Patent, is—

1. A velocipede in which the two large wheels are secured upon independent axles, and one of said wheels alone acts as the propeller to the vehicle, in combination with said independent axles, which are arranged in the same horizontal line and butt against each other end to end, substantially as and for the purpose specified.

2. A velocipede in which the two large wheels of equal diameter are secured upon independent axles arranged in the same horizontal line, and one of said axles arranged and combined with means wherewith it can be rotated to propel the velocipede, substantially as and for the purpose specified.

3. In a velocipede, the axle-frame consisting of the two bearings D D, joined in the middle by a yoke or frame, C, one side of which is split, in combination with a bolt, whereby said bearings may be set at various angles, substantially as and for the purpose specified.

4. In a velocipede, the combination of frame D C, wheels A, one of which is upon a shaft, E, and the other upon shaft F, provided on its inner end with a wheel, G, seat P, frames B M N, or their equivalent, crank-axle H, cranks K, adjustable bearings L, wheel I, and chain J, or its equivalent, steering-levers V, rods U, axle Q, arms *t*, steering-wheels T, projection R from axle Q, and pivot S, substantially as and for the purpose specified.

5. In a velocipede, the wheels A upon independent axles, and provided with brake-wheels X, in combination with brake-levers W, frame D, with its lug *y*, and brake-straps Y, substantially as and for the purpose specified.

6. In a velocipede, a seat, when arranged close above the axle-frame and between the two wheels, and combined with means to propel the velocipede, located below and in front of the seat, whereby all danger of upsetting is avoided and the machine is made adaptable to women as well as men, two loosely-pivoted steering-levers, one arranged on each side of the seat, and one or more steering or trailing wheels, arranged close to the rear of the seat and between the two large wheels, the said steering-levers being operated to steer the velocipede, in a manner similar to guiding a horse, by the reins—that is to say, by pulling upon the right-hand lever the velocipede turns to the right, and vice versa, and by pulling upon both of said steering-levers greater force can be exerted to propel said velocipede—substantially as and for the purpose specified.

7. In a velocipede, large wheels A, arranged in front, and small steering-wheels T, arranged between said wheels and to the rear, in combination with a frame connecting said wheels together, means to pivot said steering-wheels to said frame, and two steering-levers, V, and rods U, arranged as shown, substantially as and for the purpose specified.

8. In a rear-steering velocipede, the combination of a straight axle-frame carrying the axles of the two large independent wheels, with two independent axles arranged in line and having their ends working against each other, and two independent large wheels arranged upon said axles, a seat arranged above and slightly to the rear of said frame and axles, one or more rear steering-wheels, and means to govern said steering-wheels, as set forth.

In testimony of which invention I have hereunto set my hand.

JAMES O. BROWN.

Witnesses:
R. A. GAVIN,
R. S. CHILD, Jr.